(12) United States Patent
Fäcke et al.

(10) Patent No.: US 10,670,789 B2
(45) Date of Patent: Jun. 2, 2020

(54) METHOD FOR PRODUCING A BEAM SHAPING HOLOGRAPHIC OPTICAL ELEMENT

(71) Applicant: Covestro Deutschland AG, Leverkusen (DE)

(72) Inventors: Thomas Fäcke, Leverkusen (DE); Friedrich-Karl Bruder, Krefeld (DE); Günther Walze, Leverkusen (DE); Andrey Putilin, Moscow (RU)

(73) Assignee: Covestro Deutschland AG, Leverkusen (DE)

(*) Notice: Subject to any disclaimer, the term of this patent is extended or adjusted under 35 U.S.C. 154(b) by 159 days.

(21) Appl. No.: 15/775,649

(22) PCT Filed: Nov. 18, 2016

(86) PCT No.: PCT/EP2016/078166
§ 371 (c)(1),
(2) Date: May 11, 2018

(87) PCT Pub. No.: WO2017/085274
PCT Pub. Date: May 26, 2017

(65) Prior Publication Data
US 2018/0329127 A1     Nov. 15, 2018

(30) Foreign Application Priority Data
Nov. 20, 2015   (EP) .................................... 15195668

(51) Int. Cl.
*G02B 5/32*     (2006.01)
*G03H 1/04*     (2006.01)
(Continued)

(52) U.S. Cl.
CPC ............. *G02B 5/32* (2013.01); *G03H 1/0248* (2013.01); *G03H 1/0404* (2013.01); *G03H 1/28* (2013.01);
(Continued)

(58) Field of Classification Search
CPC ...... G02B 5/02; G02B 5/0205; G02B 5/0236; G02B 5/0252; G02B 5/0268;
(Continued)

(56) References Cited

U.S. PATENT DOCUMENTS 5,418,631 A * 5/1995 Tedesco ............... G02B 5/0252
                                          349/176
5,796,499 A * 8/1998 Wenyon ................. G03B 21/62
                                          348/757

(Continued)

OTHER PUBLICATIONS

International Search Report for PCT/EP2016/078166 dated Jan. 5, 2017.

(Continued)

*Primary Examiner* — Arnel C Lavarias
(74) *Attorney, Agent, or Firm* — Faegre Drinker Biddle & Reath LLP (57) ABSTRACT

A method for recording a plurality of scatter volume holograms in a photopolymeric recording medium, the method including at least the following steps providing a first laser light source, providing a photopolymeric recording medium including a substrate and a photoactive layer, wherein the photopolymeric recording medium has an index modulation $\Delta n$ of at least 0.04 and a thickness d of the photoactive layer of at least 25 μm, and irradiating the photopolymeric recording medium with the first laser light beam generated by the first laser light source with a minimum irradiation energy dosage of $3*D_i$, $D_i$ being the inhibition dosage of the photoactive layer.

15 Claims, 6 Drawing Sheets

(51) Int. Cl.
*G03H 1/02* (2006.01)
*G03H 1/28* (2006.01)
*G03H 1/22* (2006.01)

(52) U.S. Cl.
CPC . *G03H 2001/2226* (2013.01); *G03H 2240/52* (2013.01); *G03H 2240/54* (2013.01); *G03H 2240/55* (2013.01); *G03H 2260/12* (2013.01)

(58) Field of Classification Search
CPC .. G02B 5/0273; G02B 5/0278; G02B 5/0294; G02B 5/32; G03H 1/00; G03H 1/0005; G03H 1/02; G03H 1/024; G03H 1/0248; G03H 2001/026; G03H 2001/0264; G03H 2001/0268; G03H 1/04; G03H 1/0402; G03H 1/0404; G03H 1/0408; G03H 2001/0413; G03H 2001/0434; G03H 2001/0439; G03H 2001/0441; G03H 1/0465; G03H 1/0493; G03H 1/26; G03H 2001/2605; G03H 2001/2625; G03H 1/30; G03H 2260/00; G03H 2260/12; G03H 2260/50

USPC ...... 359/1, 3, 10, 11, 15, 22, 24, 25, 28, 32, 359/33, 35, 599; 430/1, 2
See application file for complete search history.

(56) References Cited

U.S. PATENT DOCUMENTS

| | | | |
|---|---|---|---|
| 6,762,865 B1* | 7/2004 | Edwards | G03H 1/04 359/22 |
| 2012/0188791 A1* | 7/2012 | Voloschenko | G02B 5/0252 362/606 |
| 2015/0177443 A1 | 6/2015 | Faecke et al. | |

OTHER PUBLICATIONS

Written Opinion of the International Searching Authority for PCT/EP2016/078166 dated Jan. 5, 2017.

* cited by examiner

METHOD FOR PRODUCING A BEAM SHAPING HOLOGRAPHIC OPTICAL ELEMENT

CROSS-REFERENCE TO RELATED APPLICATIONS

This application is a national stage application (under 35 U.S.C. § 371) of PCT/EP2016/078166, filed Nov. 18, 2016, which claims benefit of European Application No. 15195668.7, filed Nov. 20, 2015, both of which are incorporated herein by reference in their entirety.

The invention relates to a method for recording a plurality of scatter volume holograms in a photopolymeric recording medium. The invention relates also to a plurality of scatter volume holograms recorded by this method and an illumination system having at least one homogenous light emitting surface.

BACKGROUND OF THE INVENTION

Holograms become more and more popular for a plurality of applications, such as liquid crystal displays or backlight units of e.g. vehicles. For recording a hologram having a desired grating, a recording medium can be irradiated by a laser light beam (e.g.: H. M. Smith in "Principles of Holography", Wiley-Interscience 1969). One known method is the so called dual-beam method. In this method, a first laser light beam and a second laser light beam are provided by preferably a single laser light source. By irradiating the recording medium with both laser light beams, a static intensity modulation is generated at the location of the recording medium due to optical interference. According to the applied intensity modulation, a refractive index modulation is formed through a photo reaction. Within the generated grating or modulation, the holographic information is stored.

In an exemplified application of an illumination system, such as a directional backlight unit for general electronics, automotive electronic displays, flat illumination devices for general lighting, illuminated signage applications, a hologram produced according to the above described method is usually illuminated by one or more light sources, such as lasers or LEDs (light-emitting diodes). For instance, a plurality of LEDs can be positioned at a narrow side or edge face of a light guiding stack comprising at least the recorded medium.

Figure 6A:
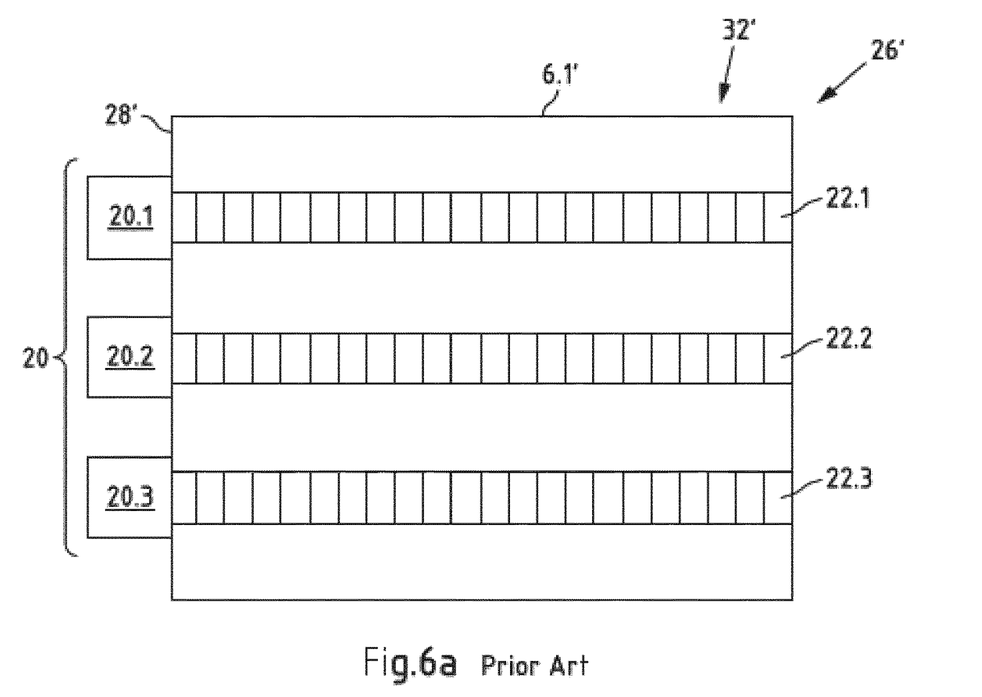

A top view of an exemplified embodiment of an essentially plane illumination system 26' according to the prior art having a medium 6.1' which has been recorded according to a method of the prior art is depicted in FIG. 6a. In particular, the depicted embodiment shows the light picture emitted by the illumination system 26' if the viewing angle of an observer is 90° to the plane of the illumination system 26'. In the shown embodiment, three light sources 20.1 to 20.3, such as LEDs, are arranged at the (left) narrow side 28' of the light guiding stack 32' having a recorded medium 6.1'. Each light source 20.1 to 20.3 generates a light beam which propagates within the recorded medium 6.1' due to total internal reflection. The light is coupled out by suitable coupling out structures (not shown). As can be seen from FIG. 6a, the three light sources 20.1 to 20.3 generate three essentially parallel light strips 22.1 to 22.3. A disadvantage of the recorded medium 6.1' of prior art is that no homogenous light emitting surface about essentially the total area of the broad surface of the light guiding stack 32' is perceived by an observer. For instance, between light strip 22.1 and light strip 22.2 as well as between light strip 22.2 and light strip 22.3, an unlighted strip can be perceived.

Figure 6B:
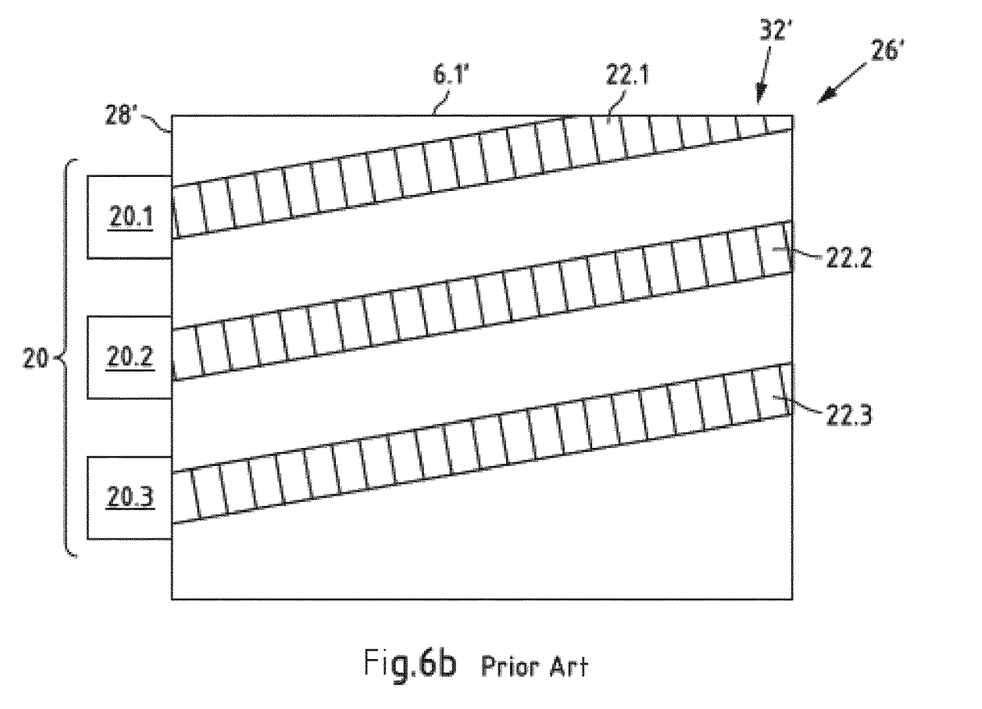

The FIG. 6b shows another view of the same example as shown in FIG. 6a. The difference between FIGS. 6a and 6b is the viewing angle of the observer. The viewing angle in FIG. 6b is 60°. As can be seen from FIG. 6b, in comparison to the course of the light strips in FIG. 6a, the different viewing angle causes that the visible light strips are perceived at a different angle. However, also in this case (and every other viewing angle), no homogenous light emitting surface about the (essentially) total surface of the light guiding stack 32' can be perceived.

BRIEF SUMMARY OF THE INVENTION

Therefore, it is an object of the present invention to provide a method for recording holograms in a photopolymeric recording medium which enables to produce a recorded medium providing an essentially homogenous light emitting surface perceivable by an observer about essentially the total surface of the recorded medium.

The object is solved according to a first aspect of the present invention by a method for recording a plurality of scatter volume holograms in a photopolymeric recording medium.

The method comprises at least the following steps:
 a. providing a first laser light source;
 b. providing a photopolymeric recording medium comprising a substrate and a photoactive layer, wherein the photopolymeric recording medium has an index modulation $\Delta n$ of at least 0.04 and a thickness d of the photoactive layer of at least 25 µm;
 c. irradiating the photopolymeric medium with the first laser light beam generated by the first laser light source with a minimum irradiation energy dosage of $3*D_i$, $D_i$ being the inhibition dosage of the photoactive layer;
wherein the irradiation of the photopolymeric recording medium is performed such that the light of the irradiating first laser light beam is scattered at scattering centers, the scattering centers being generated by the chemical reaction in the photoactive layer induced by the first laser light beam thus forming a plurality of scatter volume holograms by interaction between the irradiating first laser light beam and the scattered light of the first laser light beam.

In contrast to the methods for recording holograms in a recording medium according to the prior art, the method according to the present invention causes the generation of scatter volume holograms within the photopolymeric recording medium. In turn, the generated scatter volume holograms allow that the respectively produced hologram provides an essentially homogenous light emitting surface perceivable by an observer over the essentially total surface of the produced hologram and recorded medium, respectively. It shall be understood that in case, only a part of the recording medium is irradiated, only the respective surface part of the recording medium provides an essentially homogenous light emitting surface.

It has been recognized by the inventors that in recording mediums known from the prior art, the observer perceives light strips (and not a homogenous light emitting surface) due to a limited radiation angle distribution of the recording medium. The hologram of a recording medium produced according to prior art methods causes that indeed the amount of irradiated light is homogenous. However, the direction of the irradiated light, and thus, the light perceivable by an observer is not homogenous due to the limited radiation angle distribution of the recording medium. According to the present invention, due to the generation of scatter volume holograms, the radiation angle range distribution is enlarged such that an observer can perceive an essentially homogenous light emitting surface. In other words, a homogenous angle radiation can be provided.

DETAILED DESCRIPTION OF THE INVENTION

According to the present method, a first laser light source is provided. The first laser light source is configured to generate at least one first laser light beam. The first laser light source might be arranged such that the photopolymeric recording medium can be irradiated by the first laser light beam.

It shall be understood that in a recording arrangement the first laser light beam can be directed and/or modulated by one or more optical modules, such as a lens, a mirror, an information mask, a scattering module, and/or the like. This allows irradiating the photopolymeric recording medium in a desired manner. For instance, the at least one optical module can be configured such that the laser light beam impacting the photopolymeric recording medium comprises a desired diameter and/or a desired incident angle.

The photopolymeric recording medium comprises at least one substrate and at least one photoactive layer. The substrate may support the photoactive layer. For instance, the photoactive layer can be laminated onto the substrate. The substrate may be a transparent or translucent element. In a preferred embodiment, the substrate may be a glass plate, in particular, a float glass plate or a Nextrema® glass plate.

In order to generate the scatter volume holograms within the photopolymeric recording medium, an especially formed photopolymeric recording medium is provided. The provided photopolymeric recording medium comprises a particular index modulation range. According to the present invention, the index modulation $\Delta n$ must be at least 0.04. According to the invention, it has been observed that the used medium must have a particular index modulation ($\Delta n \geq 0.04$) in order to enable the generation of scatter volume holograms within the photopolymeric recording medium. The index modulation $\Delta n$ may preferably be at least 0.05.

In addition thereto, a photoactive layer with a large thickness is provided. In particular, the photoactive layer comprises a thickness of at least 25 µm. Recording mediums used according to prior art recording methods are usually much thinner. It has been recognized that if the photoactive layer comprises a smaller thickness than 25 µm, it is not possible to generate a sufficiently amount of scatter volume holograms within the photoactive layer for providing a recording medium having an essentially homogenous light emitting surface perceivable by an observer. In particular, the combination of a particular index modulation $\Delta n$ and a particular thickness of the photopolymeric recording medium enables the generation of scatter volume holograms within the photopolymeric recording medium.

Furthermore, for causing the generation of the desired scatter volume holograms within the photoactive layer, it is required to form a first laser light beam with a particular minimum irradiation energy dosage of $3*D_i$. Thereby, $D_i$ is the inhibition dosage of the photoactive layer. If a laser light beam is generated with an irradiation energy dosage below $D_i$, almost all photons are intercepted by radical catchers. Hence, scatter volume holograms could not be generated. Therefore, in order to initiate the following described chemical process, it is required that the first laser light source is capable of generating at least one first laser light beam with the irradiation energy dosage of at least $3*D_i$.

According to the present invention, the irradiation of the photopolymeric recording medium is performed such that the light of the irradiating first laser light beam is scattered at scattering centers. More particularly, during a start phase of the total irradiation process, the first laser light beam can generate scattering centers (for an intermediate time). The start phase may be between the start time $t_{start}=0$ of the irradiating process and a time point $t_x$, wherein $t_x \ll t_{end}$. Thereby, $t_{end}$ is the end time of the irradiation process. For instance, the start phase may be 0.1% to 10% of the total irradiation process time. The scattering centers are generated by the chemical reaction in the photoactive layer induced by the first laser light beam.

Then, a plurality of scatter volume holograms are formed by interaction between the irradiating first laser light beam and the scattered light of the first laser light beam. The scattered light of the first light beam results from light which is scattered by the scattering centers. After the generation of first scatter volume holograms, further scatter volume holograms may be formed by interaction between the irradiating first laser light beam and the light scattered by the first scatter volume holograms. The generated scatter volume holograms have different and randomly generated properties. Since the photoactive layer comprises a plurality of scatter volume holograms having different properties, such as a different grating constant, a photopolymeric recording medium can be produced which (used in an illumination system) provides an essentially homogenous light emitting surface perceivable by an observer. In particular, an essentially homogenous angle radiation can be provided.

In other words, the proposed holographic recording method is based on nonlinear interaction of at least one signal beam, such as the first laser light beam, and at least one self-generated spatially structured reference beam. At the scattering centers, the signal beam is scattered, thus forming a self-generated spatially structured reference beam. The signal beam can be coherent, partly coherent or non-coherent to the reference beam.

In particular, it has been recognized that by generating the chemical reaction for forming scattering centers causes the start of a series of reaction resulting in the formation of a plurality of scatter volume holograms within the photoactive layer. This recorded medium can be comprised by a light guiding stack of an illumination system allowing the emission of an essentially homogenous light field perceivable by an observer over the essentially total surface.

According to a first embodiment of the method according to the present invention, a second laser light beam can be provided. The first laser light beam can interact with the second laser light beam to record a further volume hologram in addition to the plurality of scatter volume holograms. The further volume hologram can be capable to deflect light from the first laser light beam in an essentially different direction. The second laser light beam can be preferably generated by the first laser light source. The first laser light beam and the second laser light beam can hit the photopolymeric recording medium at the same surface of the photopolymeric recording medium or at opposite surfaces of the photopolymeric recording medium.

In a preferred embodiment of the method according to the invention, the first and second laser light beams may be a reference beam and an object beam. The object beam may be the beam that carries information to be stored in the photopolymeric recording medium. For instance, the object beam is the beam which is reflected off the object or which has passed the object to be recorded. When the object beam and the reference beam reach the photopolymeric recording element, their light waves can intersect and interfere with each other. It is this interference pattern that is imprinted on the photopolymeric recording medium as the further volume hologram. By using a second laser light beam, a well-defined volume hologram can be generated besides the plurality of scatter volume holograms.

According to a further preferred embodiment of the method according to the invention, the first laser light beam and/or the second laser light beam can be provided in edge-lit configuration. For instance, an optical light directing element can be provided at one surface of the photopolymeric recording medium. Preferably, the optical light directing element can directly contact the surface of the substrate of the photopolymeric recording medium. For instance, a prismatic element can be arranged. One surface of the prismatic element can be in optical contact with the surface of the substrate. It shall be understood that optical contact includes the use of connection means, such as an adhesive or the like. At least one of the laser light beams can hit the prismatic element. The laser light beam can be directed by the prismatic element onto the photopolymeric recording medium with particular properties. The properties may depend (among others) on the used prismatic element.

Furthermore, the photopolymeric recording medium can comprise any suitable photopolymeric recording material. In preferred embodiments, the photopolymeric recording medium may preferably comprise a photopolymer film comprising a cross-linked matrix and writing monomers, preferably comprising a cross-linked matrix and acrylate based monomers. Such a material is particular suitable for forming a holographic element comprising a plurality of scatter volume holograms.

A further aspect of the present invention is a plurality of scatter volume holograms recorded according to the method described hereinbefore.

A further aspect is a recording system for recording a plurality of scatter volume holograms in a photopolymeric recording medium according to the method described hereinbefore.

Another aspect of the present invention is an illumination system having at least one homogenous light emitting surface perceivable by an observer. The illumination system comprises at least one light source. The illumination system comprises a light guiding stack comprising a light guide plate with a photopolymeric recording medium attached to at least one side of the light guide plate, the photoactive layer of the photopolymeric recording medium having a plurality of scatter volume holograms recorded. The at least one light source and the light guiding stack are arranged with respect to each other such that light emitted from the at least one light source is coupled into the light guide plate via a first edge face of the light guide plate.

The light is coupled out from the light guiding stack hemispherically in free space. The light coupled out from the light guiding stack has a first FWHM angle α of the angular distribution of radiation in a first polar sectional plane and a second FWHM angle β of the angular distribution of radiation in a second polar section plane, wherein α>>β.

The illumination system comprises at least one light source for emitting light into a light guiding stack. The light guiding stack comprises the photopolymeric recording medium recorded according to a method described above. The light guiding stack is configured to couple out light using the generated hologram. Due to the plurality of scatter volume holograms within the photopolymeric recording medium, the illumination system provides at least one homogenous light emitting surface which can be perceived by an observer.

According to a first embodiment of the illumination system according to the present invention, the system may comprise at least one second light source arranged such that the light from the at least second light source is coupled into the light guide plate via a at least a second edge face. The homogeneity of the light emitting surface can be further improved.

Furthermore, according to another embodiment of the present invention, the at least one light source and/or the at least one second light source can be light emitting diodes (LED). In particular, an array of LEDs can be provided as at least one light source and/or the at least one second light source. LEDs are especially suitable for lighting a light guiding stack comprising the photopolymeric recording medium recorded according to a method described above. A particular homogenous light emitting surface can be provided.

These and other aspects of the present patent application become apparent from and will be elucidated with reference to the following figures. The features of the present application and of its exemplary embodiments as presented above are understood to be disclosed also in all possible combinations with each other.

In the figures show.

Like reference numerals in different figures indicate like elements.

Figure 1:
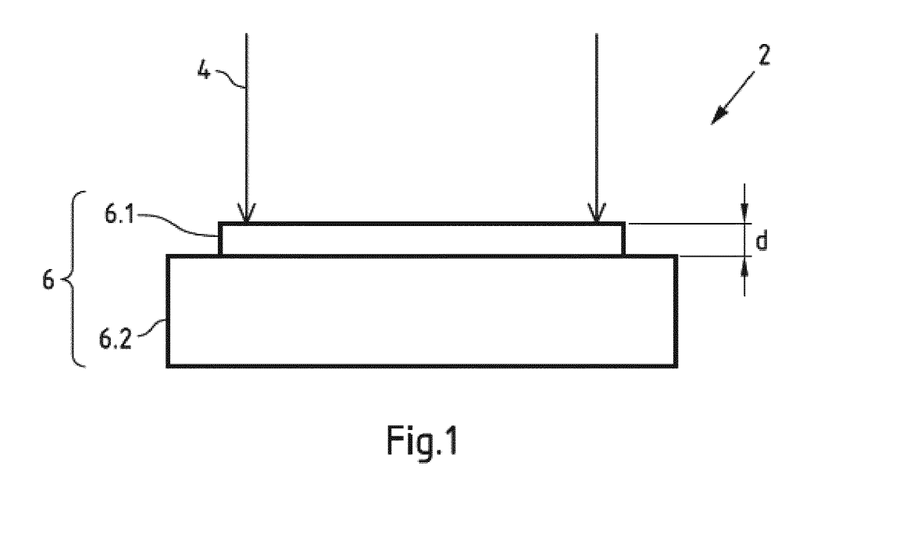
FIG. 1 a schematic view of an embodiment of an arrangement for conducting a method recording a plurality of scatter volume holograms in a photopolymeric recording medium according to the present invention, FIG. 2 a schematic view of a further embodiment of an arrangement for conducting a further method for recording a plurality of scatter volume holograms in a photopolymeric recording medium according to the present invention, FIG. 3 a schematic view of a further embodiment of an arrangement for conducting a further for recording a plurality of scatter volume holograms in a photopolymeric recording medium according to the present invention, FIG. 4a a schematic section view of a photopolymeric recording medium at an exemplified first point in time during the conduction of an embodiment of the method for recording a plurality of scatter volume holograms in a photopolymeric recording medium according to the present invention, FIG. 4b a schematic section view of the photopolymeric recording medium of FIG. 4a at an exemplified further point in time during the conduction of an embodiment of the method for recording a plurality of scatter volume holograms in a photopolymeric recording medium according to the present invention, FIG. 4c a schematic section view of the photopolymeric recording medium of FIG. 4a at an exemplified further point in time during the conduction of an embodiment of the method for recording a plurality of scatter volume holograms in a photopolymeric recording medium according to the present invention, FIG. 5 a schematic section view of a photopolymeric recording medium at an exemplified point in time during the conduction of a further embodiment of the method for recording a plurality of scatter volume holograms in a photopolymeric recording medium according to the present invention, FIG. 6a a schematic top view of an illumination system of the prior art comprising a recording medium recorded according to a method of the prior art, FIG. 6b a further schematic view of an illumination system of the prior art comprising a recording medium recorded according to a method of the prior art, FIG. 7a a schematic top view of an embodiment of an illumination system according to the present invention, and FIG. 7b a further schematic view of the embodiment of an illumination system according to the present invention.

FIG. 1 shows a schematic view, in particular, a sectional view of an embodiment of an arrangement 2 or recording system 2, respectively, for recording a plurality of scatter volume holograms in a photopolymeric recording medium 6 according to the present invention. A first embodiment of the method according to the present invention will be described by the aid of FIG. 1.

As can be seen from FIG. 1, a photopolymeric recording medium 6 is provided. The depicted photopolymeric recording medium 6 comprises a substrate 6.2 and a photoactive layer 6.1. In other embodiments of the invention, the photopolymeric recording medium may comprise further layers, such as at least one further layer on top of the photoactive layer 6.1.

The substrate 6.2 may be a transparent or translucent element 6.2. Preferably, a glass plate 6.2 can be provided. The photoactive layer 6.1 might be laminated onto the substrate 6.2. The photoactive layer may be a photopolymer film comprising a cross-linked matrix and writing monomers, preferably comprising a cross-linked matrix and acrylate based monomers.

Furthermore, the photopolymeric recording medium 6 has an index modulation Δn of at least 0.04. The thickness d of the photoactive layer 6.1 is at least 25 µm, preferably at least 30 µm.

In addition, a first laser light beam 4 of a first laser light source (not shown) is provided. It is noted that for the sake of clarity further optical elements required for directing the first laser light beam, such as lenses, mirrors, etc., have been omitted in FIGS. 1 to 3.

In the present embodiment, the first laser light beam hits the photopolymeric recording medium 6 on a (broad) surface. In the present example, a first the first laser light beam 4 hits onto the photoactive layer 6.1.

The photopolymeric recording medium 6 is irradiated by the first laser light source with a minimum irradiation energy dosage of $3*D_i$, $D_i$ being the inhibition dosage of the photoactive layer. Thereby, the irradiation of the photopolymeric recording medium 6 is performed such that the light of the irradiating first laser light beam is scattered at scattering centers, the scattering centers being generated by the chemical reaction in the photoactive layer induced by the first laser light beam. Thus, a plurality of scatter volume holograms is formed by interaction between the irradiating first laser light beam and the scattered light of the first laser light beam. This will be elucidated in more detail in the following.

Figure 2:
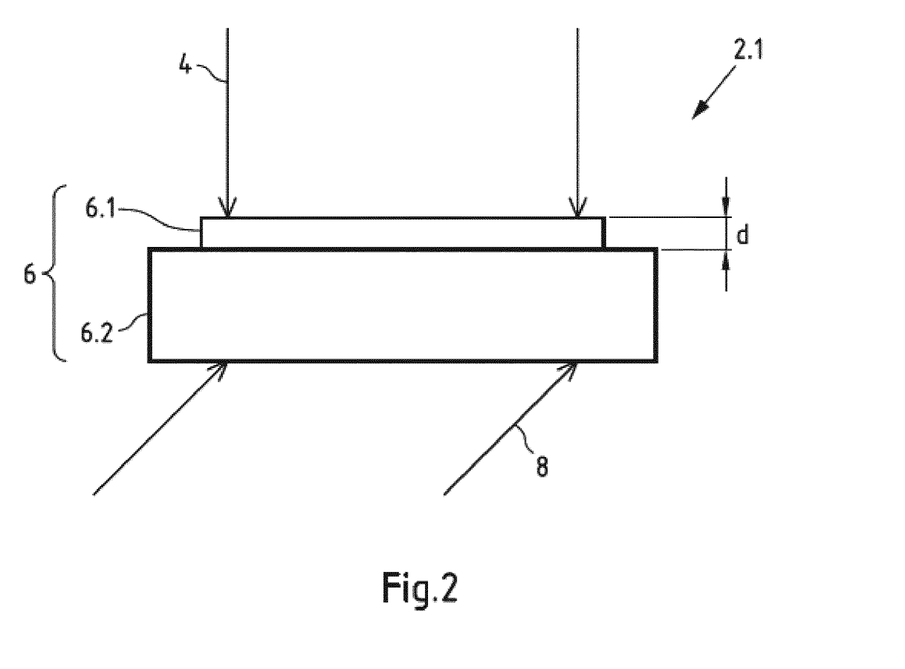

FIG. 2 shows a schematic view of a further embodiment of an arrangement 2.1 or recording system 2.1 for recording a plurality of scatter volume holograms in a photopolymeric recording medium 6 according to the present invention. A further embodiment of the method according to the present invention will be described by the aid of FIG. 2. In order to avoid repetitions, only the differences between the embodiment of FIG. 1 and the embodiment of FIG. 2 will be described in the following.

In contrast to the embodiment of FIG. 1, the photopolymeric recording medium 6 is irradiated with a second laser light beam 8. The second laser light beam 8 is preferably provided by the first laser light source. For instance, the laser light beam of the first laser light source can be divided into the first laser light beam 4 and the second laser light beam 8 by a beam splitter element. By way of example, the first laser light beam 4 may be an object beam and the second laser light beam 8 may be a reference beam.

The first laser light beam 4 can be spread using lenses and directed onto the photopolymeric recording medium 6. The second laser light beam 8 can also be spread through the use of lenses. In the present embodiment, the respective laser light beams 4 and 8 irradiate the photopolymeric recording medium 6 from opposite sides. In other embodiments, the first and second laser light beams can irradiate the photopolymeric recording medium from the same side.

When the two laser light beams 4 and 8 reach the photopolymeric recording medium, their light waves intersect and interfere with each other. This interference pattern is imprinted on the photopolymeric recording medium as a further volume hologram which may be capable of deflecting irradiated light in a defined manner.

Figure 3:
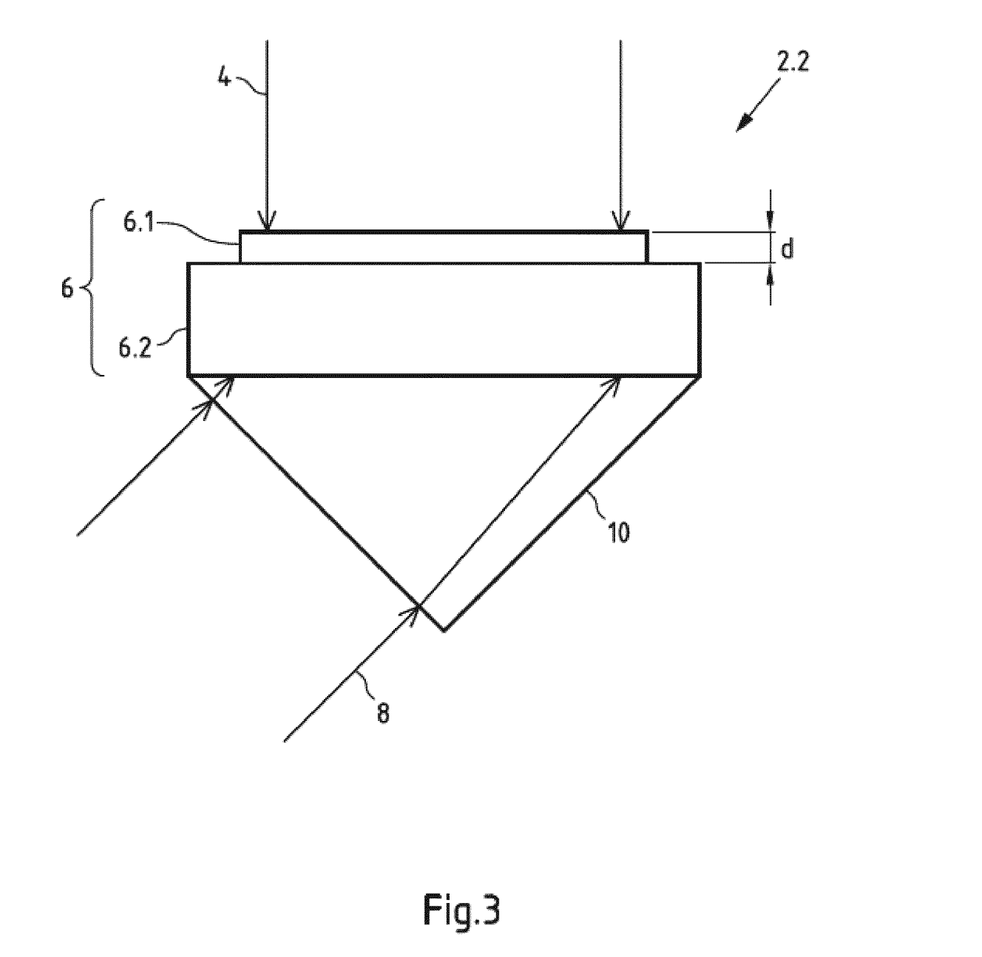

FIG. 3 shows a schematic view, in particular, a sectional view of a further embodiment of an arrangement 2.2 or system 2.2 for recording a plurality of scatter volume holograms in a photopolymeric recording medium according to the present invention. A further embodiment of the method according to the present invention will be described by the aid of FIG. 3. In order to avoid repetitions, only the differences between the embodiment of FIG. 2 and the embodiment of FIG. 3 will be described in the following.

As can be seen from the FIG. 3, there is a light directing element 10 arranged at one surface of the photopolymeric recording medium 6. In particular, a prismatic element 10 is arranged at the (bottom) surface of the photopolymeric recording medium 6. Preferably, the prism 10 is in direct contact with the substrate 6.2.

The depicted prism 10 is configured to refract the second laser light beam 8. By refracting the second laser light beam 8 through the prism 10, the laser light beam 8 can be directed onto the photopolymeric recording medium 6 with a high degree of accuracy.

As described hereinbefore, the FIGS. 1 to 3 show only schematically respective arrangements for recording a photopolymeric recording medium. Several components of a recording system have been omitted for sake of clarity. For instance, the first light beam can be directed onto an intensity shaping mask prior to hitting the photopolymeric recording medium. Furthermore, the photopolymeric recording medium can be provided with a phase shaping mask. Alternatively or additionally, there might be provided a one dimension scattering film and/or an information mask (in the beam path of the second laser light beam) and/or a beam aperture forming mask (in the beam path of the first light beam).

Furthermore, several volume holograms can be simultaneously recorded in the recording medium 6. In particular, using the arrangement of FIG. 2 or 3, there are at least three interfering beams:

A—Scatter volume holograms formed by the first laser light beam 4 and a scattered beam (generated through scattering of the first laser light beam at a scattering center and/or at an already formed scatter volume hologram).

B—Further volume hologram (being capable to deflect light from the first laser light beam in an essentially different direction) formed by the first laser light beam 4 and the second laser light beam 8.

C—Scatter volume holograms formed by the second laser light beam 8 and scattered beam (generated through scattering of the second laser light beam 8 at a scattering center and/or an already formed scatter volume hologram).

The respective holograms (A-C) have different Bragg grating angles and periods so that the interaction with a reconstructing beam can differ, too. The recorded volume hologram or grating B can have a period D corresponding to the incidence angles (the first laser light beam may propagate from the normal to the recording medium and second laser light beam angle may be β with $\pi > \beta > \arcsin(n^{-1})$)

For grating B, the following equation can be derived $$D = \frac{\lambda}{2*n*\sin\left(\frac{\pi-\beta}{2}\right)}. \quad (a)$$

And orientation a of this grating in the recording medium can be $$\alpha = -\frac{\pi-\beta}{2} \quad (b)$$

to the normal.

B—gratings provide for the outcoupling of the light beams. However, both A and C gratings may arise light power reallocation during distributed interaction of the laser light waves with the hologram. There may be several methods for eliminating recording one of those holograms.

Another variant of spatial structuring of the light beams can be a self-diffraction on the local nonuniformities of the photopolymerization recording material. In one of the variants of the method of recording this scattering or nonuniformities can be specially induced as recording information. So the hologram can reconstruct the predefined information but it looks like a scattering plate.

In the following, one embodiment of the method according to the present invention will be described. In particular, the generation of a plurality of scatter volume holograms will be described by the aid of FIGS. 4a to 4c in more detail.

Figure 4A:
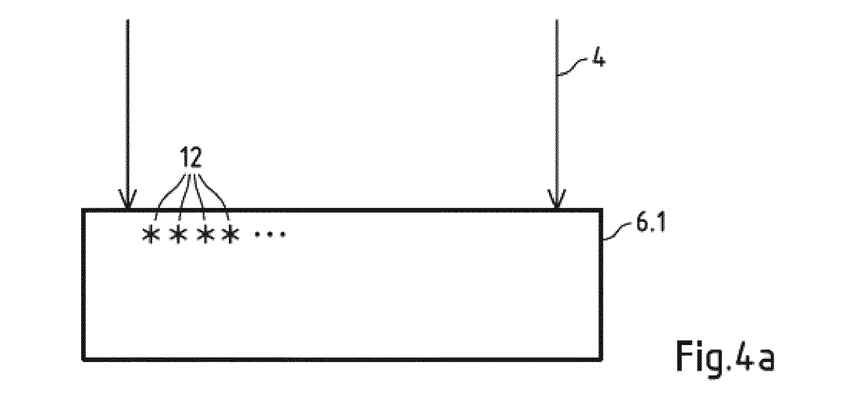

FIG. 4a shows a schematic section view of a photopolymeric recording medium at an exemplified first time point $t_1$ during the conduction of an embodiment of the method for recording a plurality of scatter volume holograms in a photopolymeric recording medium according to the present invention. As can be seen from the FIG. 4a, only the photoactive layer 6.1 is shown for sake of clarity. The photoactive layer 6.1 is irradiated with a first laser light beam 4. For instance, the arrangement 2 according to FIG. 1 is used.

In the FIG. 4a, the photoactive layer 6.1 is shown in a first state at a first point in time $t_1$. The first point in time $t_1$ is in the starting phase of the recording process. During the start phase of the recording process, scattering centers 12 are generated by the first laser light beam 4. The plurality of the scattering centers 12 are generated by the chemical reaction in the photoactive layer 6.1 induced by the first laser light beam 4. The laser light beam 4 causes molecules of the photoactive layer 6.1 to change their state and to form molecular chains. In an intermediate state, the molecules form scattering centers 12. As it is indicated by the dots, a plurality of scattering centers 12 is formed by the first light beam 4 within the photoactive layer 6.1.

Figure 4B:
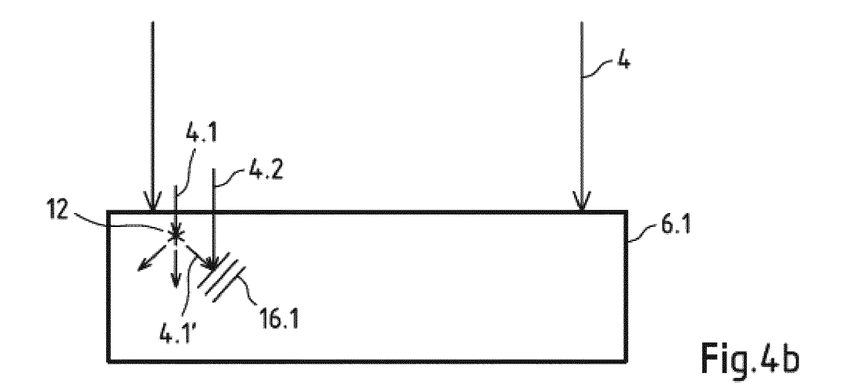

FIG. 4b shows a schematic section view of the photopolymeric recording medium, in particular, the photoactive layer 6.1 of FIG. 4a at an exemplified further time point $t_2$ during the conduction of an embodiment of the method for recording a plurality of scatter volume holograms in a photopolymeric recording medium according to the present invention. The second time point $t_2$ is later than the first time point $t_1$.

At the second exemplified point in time $t_2$, the photoactive layer 6.1 is still irradiated by the first laser light beam 4. As it is indicated in the FIG. 4b, waves 4.1 of the first laser light beam 4 hit a scattering center 12. It is noted that for sake of clarity, only a single scattering center 12 is depicted. The light or waves 4.1 are scattered by the scattering centers 12, and thus forming scattering waves 4.1'. The scattering waves 4.1' intersect and interfere with waves 4.2 of the first laser light beam 4. This interference pattern is imprinted on the photoactive layer 6.1 as scatter volume holograms 16.1. In particular, a plurality of scatter volume holograms 16.1 are formed by the interaction between the irradiating first laser light beam waves 4.2 and the scattered light waves 4.1' of the first laser light beam 4.

Figure 4C:
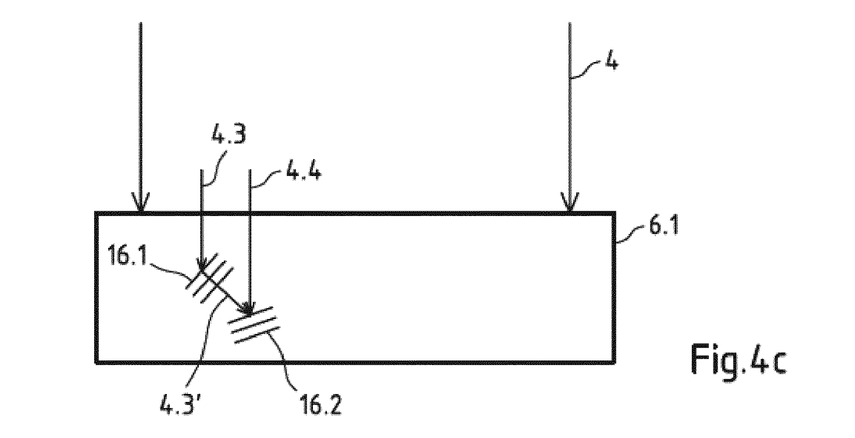

FIG. 4c shows a schematic section view of the photopolymeric recording medium, in particular, the photoactive layer 6.1 of FIG. 4a at an exemplified further point in time $t_3$ during the conduction of an embodiment of the method for recording a plurality of scatter volume holograms in a photopolymeric recording medium according to the present invention. The third point in time $t_3$ follows second time point $t_2$.

As can be seen from the FIG. 4c, the photoactive layer 6.1 is still irradiated by the first laser light beam 4. As described hereinbefore, first scatter volume holograms 16.1 have already been formed in the photoactive layer 6.1. For sake of clarity, only one scatter volume hologram 16.1 is depicted in FIG. 4c. Waves 4.3 of the first laser light beam 4 hit onto the scatter volume hologram 16.1. The scattered volume hologram scatters these waves 4.4. The scattering waves 4.3' intersect and interfere with further waves 4.4 of the first laser light beam 4. The intersection and interference causes the generation of a further scatter volume hologram 16.2.

At the end of the irradiation process, the photoactive layer 6.1 comprises a plurality of scattering volume holograms 16.

Figure 5:
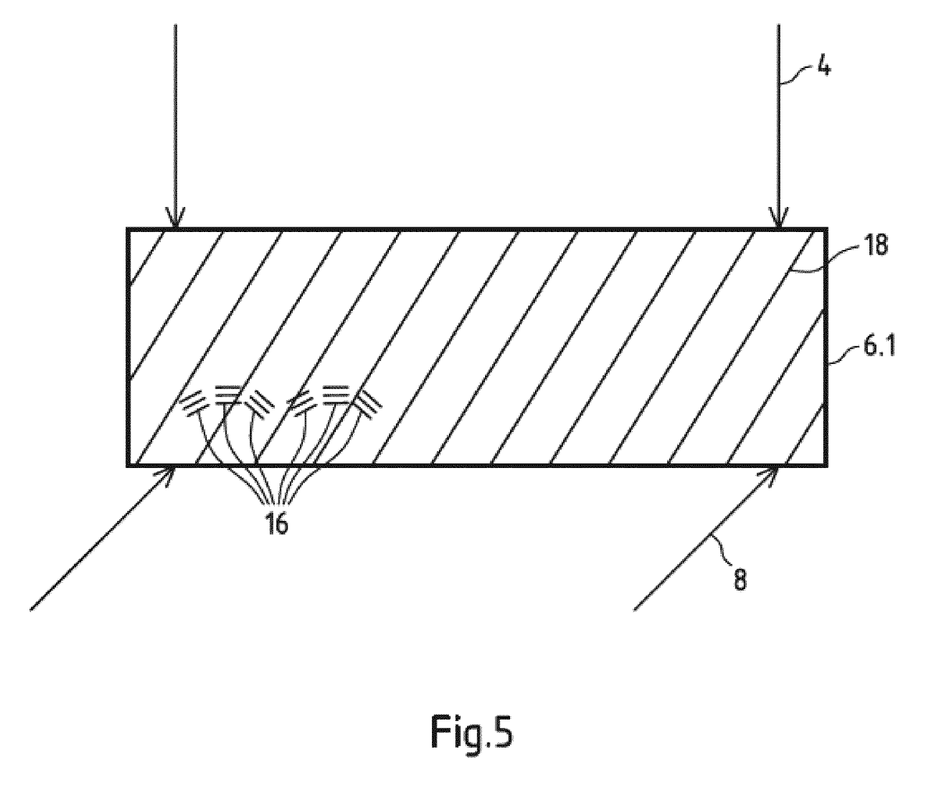

FIG. 5 shows a schematic section view of a photopolymeric recording medium at an exemplified point in time $t_e$ during the conduction of a further embodiment of the method for recording a plurality of scatter volume holograms in a photopolymeric recording medium according to the present invention.

At the point in time $t_e$ the photoactive layer 6.1 is irradiated by a first laser light beam 4 and by a second laser light beam 8. For sake of clarity, only the photoactive layer 6.1 is depicted in FIG. 5. As indicated in FIG. 5, the photoactive layer 6.1 comprises a plurality of scatter volume holograms 16. These scatter volume holograms 16 have been generated as described hereinbefore. In addition to the scatter volume holograms 16, the depicted photoactive layer 6.1 comprises a defined further volume hologram 18. The further volume hologram 18 is in particular capable to deflect light from the first laser light beam in an essentially different direction. This further volume hologram 18 is generated by an intersection and interference of the light waves of the first and second light beams 4 and 8.

Figure 7A:
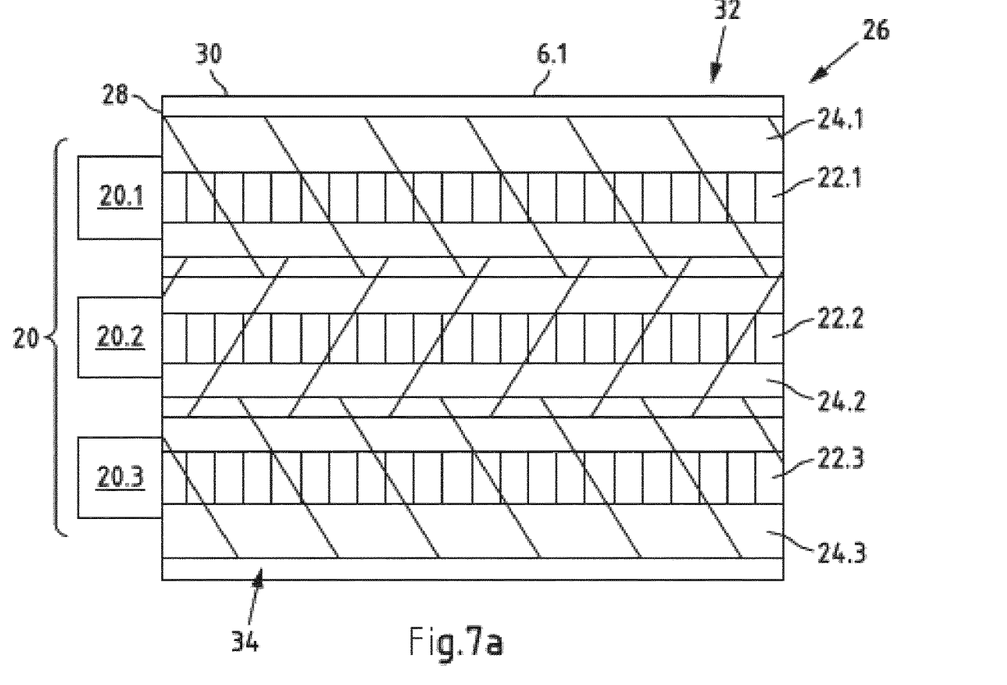

FIG. 7a shows a schematic top view of a recording medium recorded an embodiment of the method for recording a plurality of scatter volume holograms in a photopolymeric recording medium according to the present invention.

In particular, an embodiment of an illumination system 26 according to the present invention is shown in the FIG. 7a. The illumination system 26 comprises a first light source 20. The first light source 20 is in particular an array of a plurality of non-coherent light sources 20.1 to 20.3, such as LEDs 20.1 to 20.3. By way of example, three LEDs 20.1 to 20.3 are depicted.

Furthermore, the illumination system 26 comprises a light guiding stack 32. The light guiding stack 32 preferably comprises a light guide plate 30 with a photopolymeric recording medium attached to at least one side of the light guide plate 30. The photopolymeric recording medium has been recorded according to a previously described method. In particular, light guide plate 30 can comprise a photoactive layer 6.1 according to FIG. 2, 3 and/or 5. In other words, in the present example, the light guide plate 30 comprises a photoactive layer 6.1 having a plurality of scatter volume holograms and a further defined volume hologram.

As can be further seen from the FIG. 7a, the light source 20 and the light guiding plate 30 are arranged with respect to each other such that light emitted from the light source 20 is coupled into the light guide plate 30 via a first edge face 28 of the light guide plate 30. Furthermore, the light is coupled out from the light guiding stack hemispherically in free space. Thereby, the light coupled out from the light guiding stack has a first FWHM angle α of the angular distribution of radiation in a first polar sectional plane and a second FWHM angle β of the angular distribution of radiation in a second polar section plane, wherein α>>β.

Furthermore, the embodiment depicted in the FIG. 7a shows the resulting light picture perceivable by an observer if the viewing angle of the observer is 90°. In contrast to a light guiding stack according to prior art (see FIG. 6a), (essentially) the total surface 34 of the light guide plate 30 provide a homogeneous light surface perceivable by the observer. In particular, an (essentially) homogenous light emitting surface perceivable by an observer is generated by the illumination system shown in FIG. 7a. For sake of elucidation only, several light strips 22 and 24 are depicted on the surface of the light guide plate 30.

First light strips 22.1 to 22.3 result from the defined volume hologram generated by an intersection of the first and second laser light beam 4, 8. This volume hologram serves to deflect light irradiated from the edge face 28 in a normal direction with respect to the extension of the photoactive layer 6.1. Thereby, light strip 22.1 is created by LED 22.1, light strip 22.2 is created by LED 22.2 and light strip 22.3 is created by LED 22.3.

Besides these light strips 22.1 to 22.3, further light strips 24.1 to 24.3 are generated. These light strips 24.1 to 24.3 result from the plurality of scatter volume holograms of the photoactive layer 6.1 of the light guide plate 30. The light waves of LED 20.1 are scattered by the scatter volume holograms and generate the light strip 24.1. The further light strips 24.2 and 24.3 are generated accordingly.

It is noted that real tests have shown, that a nearly homogenous field is generated wherein the contours of the light strips 22.1 to 22.3 and 24.1 to 24.3 are (if at all) lightly visible by an observer.

Figure 7B:
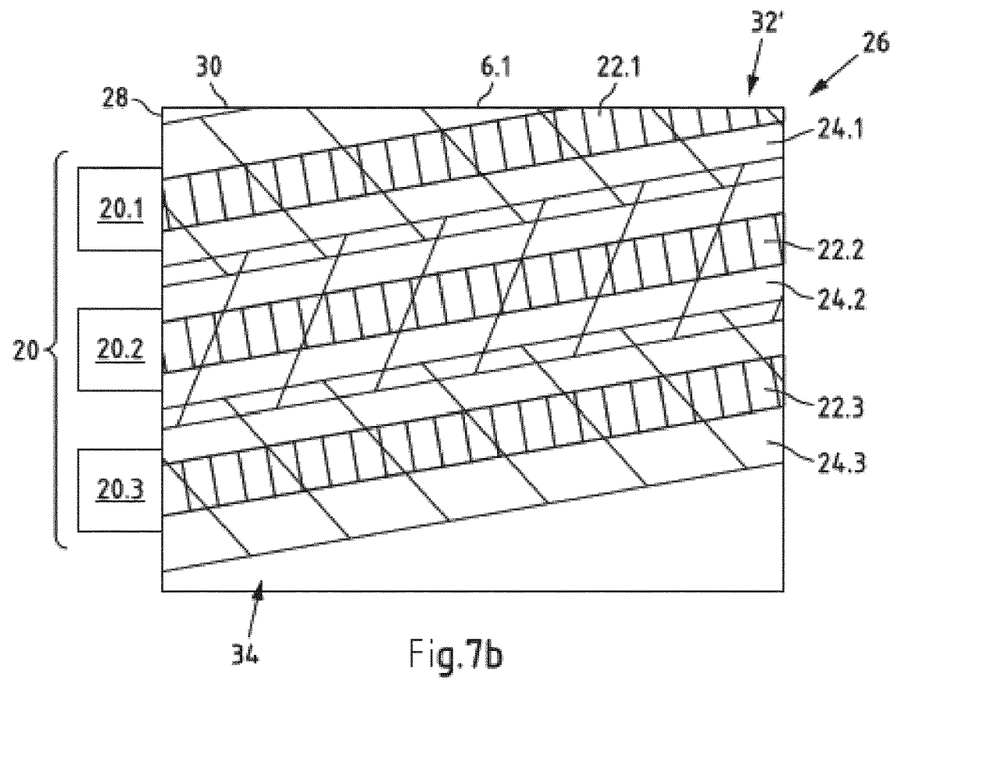

FIG. 7b shows a further schematic top view of the recording medium recorded an embodiment of the method for recording a plurality of scatter volume holograms in a photopolymeric recording medium according to the present invention. In particular, the (already described) illumination system 26 is shown in FIG. 7b. The difference between FIGS. 7a and 7b is the viewing angle of the observer. The viewing angle in FIG. 7b is (approx.) 60°.

As can be seen from FIG. 7b, in comparison to the course of the light strips 22.1 to 22.3 in FIG. 7a, the different viewing angle cause that the light strips 22.1 to 22.3 are perceived by an observer at a different angle. Furthermore, the light strips 24.1 to 24.3 resulting from the scattering volume holograms are also perceived at a different angle. Nevertheless, as can be seen from FIG. 7b, an observer still perceives an essentially homogenous light emitting surface over (almost) the total area of the light guide plate 30.

It is noted that according to further embodiments, at least a second light source (not shown), such as a further LED array, can be arranged at least at a second edge face. The second light source may be arranged such that light from this light source is coupled into the light guide plate via the at least a second edge face.

Eventually, the following is noted:

According to an embodiment of the invention, a holographic recording system and method for optical elements and light distribution recording and reproducing can comprise at least one light source; at least one optical light structuring element for spatial modulating the light beam produced by the light source mentioned above; a photorefractive recording medium sensitive in the wavelength of the light source; an information modulator for input the information in the recording system; a plurality of an auxiliary optical elements for optical beams transforming and directing; wherein the recording of the information is performed in a photorefractive recording medium as an interference between the light beam structured by the mentioned above optical light structuring element and the light beam modulated by the mentioned information modulator.

According to another embodiment, the mentioned spatial structured beam can be formed on the total internal optical boundary of recording media and air. Furthermore, according to another embodiment, the mentioned spatial structured beam can be formed by the Bragg grating of the spatial period less the spatial frequency of the signal and reference beams interference.

Moreover, the mentioned spatial structured beam can be formed on the self-scattering of the mentioned optical boundary scattering. The mentioned spatial structured beam can be directly modulated by an information modulator. The mentioned spatial structured beam can be formed on the scattering of the light directly in the photorefractive medium. Furthermore, the mentioned scattering can be caused by the phase non-uniformity of the recording medium during the recording exposure so that the scattering arises during the recording of the hologram. According to another embodiment, the phase relief of the mentioned optical boundary can perform the function of mentioned information modulator. The mentioned light source can have low coherence so that the effective interference between beam propagating through information modulator and beam formed by optical light structuring element is impossible. The system can apply two mentioned light sources non-coherent with each other so that the hologram can be recorded as a separate hologram of information beam self-recording and spatially structured reference beam self-recording, the interaction between said holograms arises because of the photorefraction recording medium.

The invention claimed is:

1. A method for recording a plurality of scatter volume holograms in a photopolymeric recording medium, the method comprising at least the following steps:
  a. providing a first laser light source
  b. providing a photopolymeric recording medium comprising a substrate and a photoactive layer, wherein the photopolymeric recording medium has an index modulation $\Delta n$ of at least 0.04 and a thickness d of the photoactive layer of at least 25 µm c. irradiating the photopolymeric recording medium with a first laser light beam generated by the first laser light source with a minimum irradiation energy dosage of $3*D_i$, $D_i$ being an inhibition dosage of the photoactive layer;

wherein the irradiation of the photopolymeric recording medium is performed such that a light of the irradiating first laser light beam is scattered at scattering centers creating a scattered light, the scattering centers being generated by a chemical reaction in the photoactive layer induced by the first laser light beam thus forming a plurality of scatter volume holograms by interaction between the irradiating first laser light beam and the scattered light of the first laser light beam.

2. The method according to claim 1, wherein a second laser light beam is provided, wherein the first laser light beam interacts with the second laser light beam to record a further volume hologram in addition to the plurality of scatter volume holograms, the further volume hologram being capable to deflect light from the first laser light beam in an essentially different direction.

3. The method according to claim 2, wherein the second laser light beam is generated by the first laser light source.

4. The method according to claim 2, wherein the first laser light beam or the second laser light beam is provided in edge-lit configuration.

5. The method according to claim 4, wherein at least one optical light directing element is provided at a surface of the photopolymeric recording medium.

6. The method according to claim 5, wherein the optical light directing element is in optical contact with the surface of the photopolymeric recording medium.

7. The method according to claim 1, wherein the photoactive layer is laminated onto the substrate.

8. The method according to claim 1, wherein the substrate is transparent or translucent.

9. The method according to claim 1, wherein the first laser light beam generates the scattering centers during a start phase of a total irradiation process.

10. The method according claim 1, wherein the photopolymeric recording medium comprises a photopolymer film comprising a cross-linked matrix and writing monomers.

11. A plurality of scatter volume holograms recorded according to the method of claim 1.

12. A recording system for recording a plurality of scatter volume holograms in a photopolymeric recording medium according to the method of claim 1.

13. An illumination system having at least one homogenous light emitting surface comprising:

a. at least one light source b. a light guiding stack comprising a light guide plate with a photopolymeric recording medium attached to at least one side of the light guide plate, the photoactive layer of the photopolymeric recording medium having a plurality of scatter volume holograms recorded according to the method of claim 1 and a second volume hologram;

wherein the at least one light source and the light guiding stack are arranged with respect to each other such that light emitted from the at least one light source is coupled into the light guide plate via a first edge face of the light guide plate, wherein the light is coupled out from the light guiding stack hemispherically in free space and wherein the light coupled out from the light guiding stack has a first Full Width Half Maximum (FWHM) angle $\alpha$ of an angular distribution of radiation in a first polar sectional plane and a second FWHM angle $\beta$ of an angular distribution of radiation in a second polar section plane, wherein $\alpha \gg \beta$.

14. The illumination system according to claim 13, wherein the system comprises at least one second light source arranged such that a light from the at least second light source is coupled into the light guide plate via a at least a second edge face.

15. The illumination system according to claim 13, wherein the at least one light source or the at least one second light source are light emitting diodes.

* * * * *